United States Patent [19]

Cullen et al.

[11] Patent Number: 4,783,206

[45] Date of Patent: Nov. 8, 1988

[54] ADSORBENT CARTRIDGE

[75] Inventors: John S. Cullen, Buffalo; Samuel A. Incorvia, Tonawanda, both of N.Y.

[73] Assignee: Multiform Desiccants, Inc., Buffalo, N.Y.

[21] Appl. No.: 98,158

[22] Filed: Sep. 18, 1987

[51] Int. Cl.$^4$ ............................................. B01D 53/04
[52] U.S. Cl. ........................................ 55/387; 55/274; 206/204; 312/31
[58] Field of Search .......... 55/274, 316, 384, 387–390; 206/0.5, 0.7, 204; 210/264, 266, 282–284, 287–289, 437–439, 502; 312/31, 31.1, 31.2, 31.3

[56] References Cited

U.S. PATENT DOCUMENTS

| | | | |
|---|---|---|---|
| 2,007,632 | 7/1935 | Blank et al. | 312/31 |
| 2,838,795 | 6/1958 | Lockwood | 55/387 X |
| 2,852,326 | 9/1958 | Westlake, Jr. | 312/31.1 |
| 3,132,909 | 5/1964 | Josefson | 312/31.1 |
| 3,170,872 | 2/1965 | Balogh et al. | 55/387 X |
| 3,240,567 | 3/1966 | Caparreli et al. | 55/387 X |
| 3,309,849 | 3/1967 | Ward | 55/387 |
| 3,315,447 | 4/1967 | Meier | 55/384 |
| 3,419,937 | 1/1969 | Bally | 425/505 X |
| 3,445,149 | 5/1969 | Kuypers | 312/31 |
| 3,567,085 | 3/1971 | Flores | 206/204 X |
| 3,722,188 | 3/1973 | Cullen | 55/384 |
| 3,739,558 | 6/1973 | Hurson | 55/387 |
| 3,799,352 | 3/1974 | McClive | 210/282 |
| 3,820,309 | 6/1974 | Cullen et al. | 55/387 |
| 3,918,578 | 11/1975 | Cullen et al. | 312/31.1 X |
| 3,990,872 | 11/1976 | Cullen | 55/274 |
| 4,116,649 | 9/1978 | Cullen et al. | 55/387 |
| 4,272,264 | 6/1981 | Cullen et al. | 55/387 |
| 4,374,571 | 2/1983 | Hirvela | 206/0.5 X |
| 4,401,447 | 8/1983 | Huber | 55/387 |
| 4,464,261 | 8/1984 | Cullen et al. | 210/282 |

FOREIGN PATENT DOCUMENTS 119418  9/1980  Japan ................................... 55/387

Primary Examiner—Robert Spitzer
Attorney, Agent, or Firm—Joseph P. Gastel

[57] ABSTRACT

An adsorbent cartridge having an elongated hollow cylindrical body member fabricated of polyethylene, polyester or polypropylene, spun-bonded polyolefin membranes closing the open ends of the body member, adsorbent within the body member, raised splines or ribs extending longitudinally on the outer surface of the body member for causing the cartridge to have a different feel than a medicinal capsule with which it may be packaged, and circumferentially extending integrally molded bands at opposite ends of the body member for reinforcing the body member against radial deflection which could result in separation of the membranes therefrom.

23 Claims, 2 Drawing Sheets

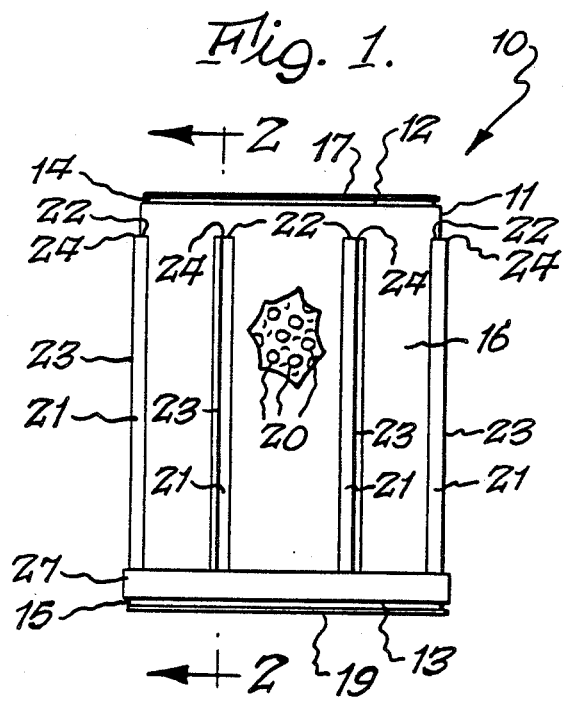
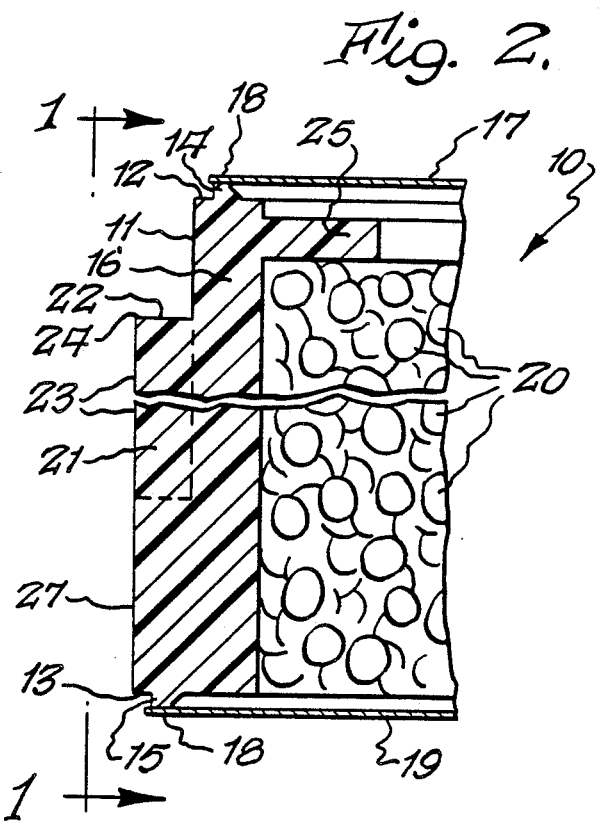
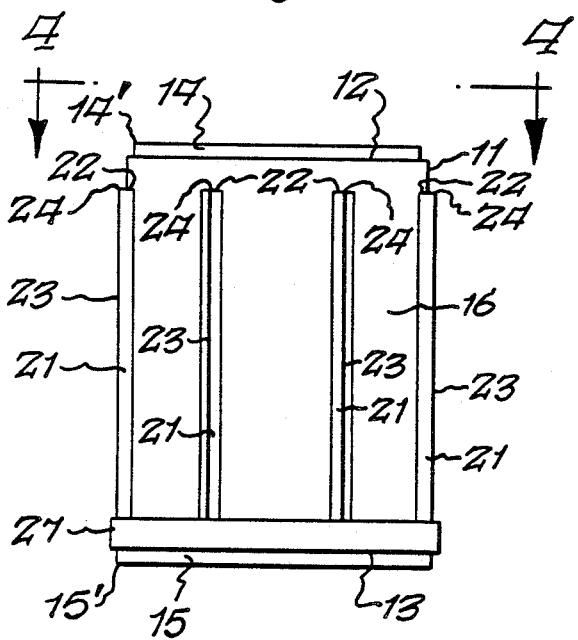
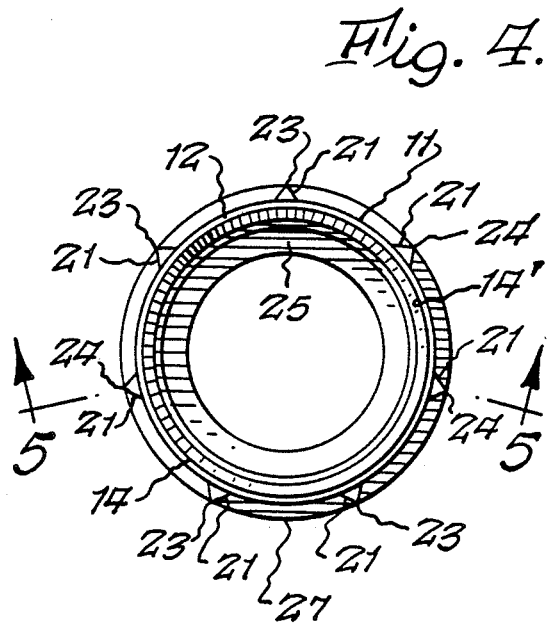

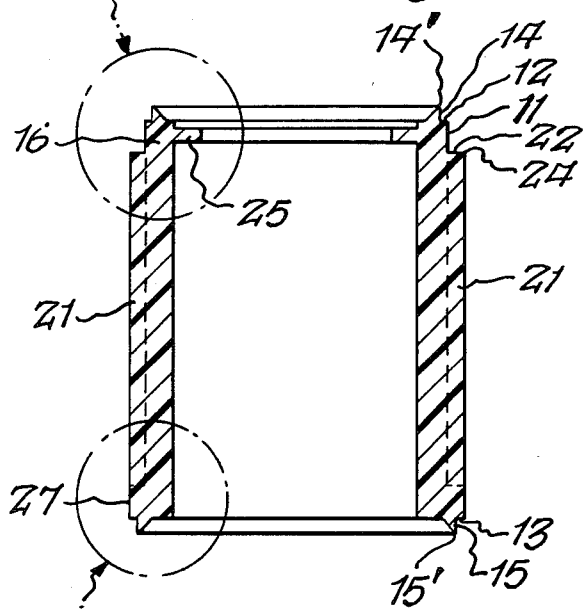
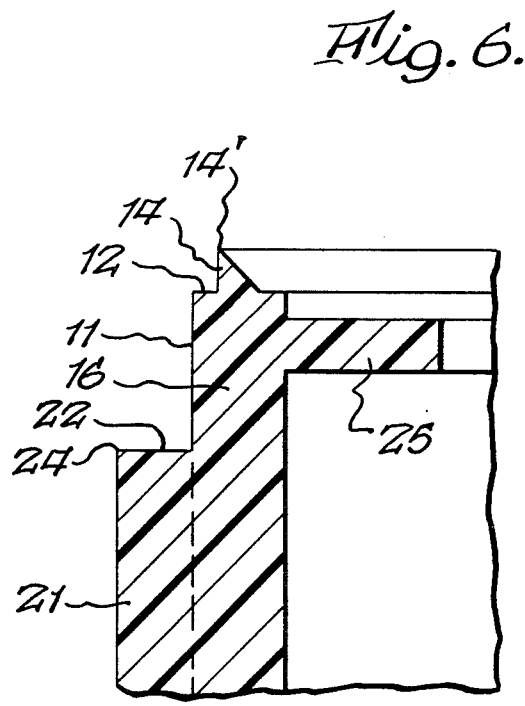
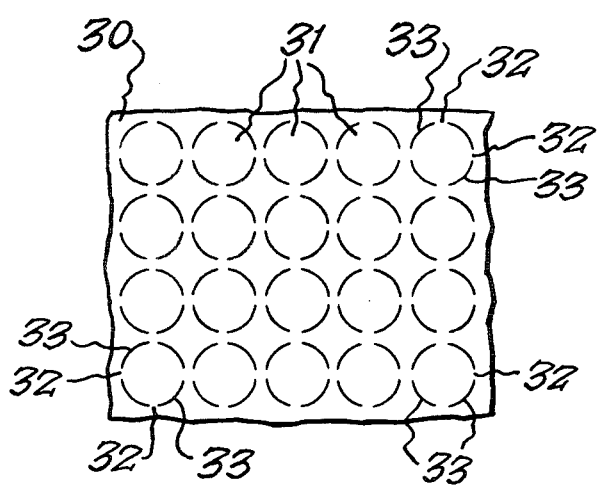
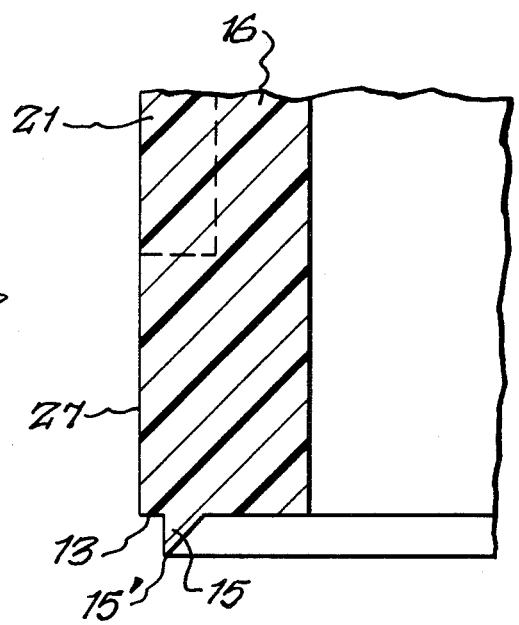

ADSORBENT CARTRIDGE

BACKGROUND OF THE INVENTION

The present invention relates to an improved adsorbent cartridge of the type which is generally placed in containers for medicinal pills or capsules to adsorb moisture, odors or other gases from the container in which they are located. The present invention is an improvement over pending application Ser. No. 720,362, filed Apr. 4, 1985.

By way of background, there are currently in use small adsorbent cartridges of the type which have an impervious body portion and a perforated end cap at one or both ends which permit communication between the environment and the adsorbent within the cartridge. Whenever activated charcoal or other like substances are used which form fine dust, this dust passes through the perforations and collects on the pills or capsules adjacent thereto. While this is perfectly harmless because the activated charcoal is non-toxic, the fact remains that the blackening of the pills or capsules makes them unappetizing. In addition, in the past the small adsorbent cartridges were often mistaken for medicinal capsules with which they were packaged and were ingested by various types of people, such as those with poor vision or who were mentally feeble. It is with overcoming the foregoing deficiency of prior types of adsorbent cartridges that the present invention is concerned.

SUMMARY OF THE INVENTION

It is accordingly the object of the present invention to provide an improved adsorbent cartridge of the type used with pills, capsules and the like and which is fabricated with components which will pass moisture vapor and gases but under no circumstances will permit the adsorbent contained therein to pass into the environment in which the cartridge is located.

Another object of the present invention is to provide an improved adsorbent cartridge of the type used in containers of pills, capsules or the like which has an outer surface configuration which is so different from a medicinal capsule that it can readily be distinguished therefrom by feel.

A further object of the present invention is to provide an improved adsorbent cartridge which is not only capable of achieving the above enumerated objects but which also can be fabricated in an extremely simple and expedient manner.

Yet another object of the present invention is to provide an improved absorbent cartridge of the type used in containers of pills, capsules, or the like which is reinforced against radial collapse by circumferentially extending bands at its opposite ends to thereby prevent separation from the body of the adsorbent cartridge of the membranes which close the ends thereof. Other objects and attendant advantages of the present invention will readily be perceived hereafter.

The present invention relates to an adsorbent cartridge for use in a container of pills, medicinal capsules, or the like, and which can be distinguished therefrom by feel comprising a hollow elongated body member having a wall with an outer surface and first and second ends, elongated ribs on said outer surface of said body member, an opening on at least one of said ends, a gas-permeable membrane closing said opening, adsorbent within said body member, and circumferentially extending band means formed integrally with at least one end of said body member to provide radial reinforcement to said body member to prevent separation of said gas permeable membrane therefrom in the event said body member is subjected to radial forces.

The present invention also relates to a method of fabricating an adsorbent cartridge including the steps of providing a hollow plastic body member with a wall and having at least one open end, providing reinforcement at said open end, providing a sheet of porous material having discs substantially of the size of said open end scored therein but attached thereto, said body member and said sheet of porous material having melting temperatures which are sufficiently close so that they can be fused together, superimposing a disc over said open end, and applying heat and pressure to said superimposed disc to fuse it to said end and simultaneously separate it from said sheet.

The various aspects of the present invention will be more fully understood when the following portions of the specification are read in conjunction with the accompanying drawings wherein:

BRIEF DESCRIPTION OF THE DRAWINGS

FIG. 1 is a side elevational view taken substantially in the direction of arrows 1—1 of FIG. 2 of an improved cartridge of the present invention having ribs thereon to distinguish it from medicinal capsules with which it is packed;

FIG. 2 is an enlarged fragmentary cross sectional view taken substantially along line 2—2 of FIG. 1;

FIG. 3 is a side elevational view of the body member without the membranes attached to its ends;

FIG. 4 is a top plan view taken substantially in the direction of arrows 4—4 of FIG. 3;

FIG. 5 is a cross sectional view taken substantially along line 5—5 of FIG. 4;

FIG. 6 is an enlarged fragmentary cross sectional view of the circled portion of FIG. 5 which is labeled FIG. 6;

FIG. 7 is an enlarged fragmentary cross sectional view of the circled portion of FIG. 5 which is labeled FIG. 7; and FIG. 8 is a fragmentary plan view of a sheet of membrane discs.

DESCRIPTION OF THE PREFERRED EMBODIMENTS

The improved adsorbent cartridge 10 of the present invention includes a generally cylindrical plastic casing or body member 11 fabricated of rigid high density polyethylene, polyester or polypropylene. The annular ends 12 and 13 on the wall 16 of body member 11 (FIGS. 3, 6 and 7) include integrally molded annular pointed protuberances 14 and 15, respectively. Secured to protuberances 14 and 15 are spun-bonded polyolefin membrane discs 17 and 19, respectively. The securing may be by any form of adhesive connection and preferably by ultrasonic welding, impulse sealing, radio frequency welding, or any other suitable process. The pointed configuration of the protuberances 14 and 15 provide high energy points to produce good sealing.

The attachment of the membrane discs 17 and 19 by means of ultrasonic welding, impulse sealing or radio frequency welding is possible because the spun-bonded polyolefin and the high density polyethylene are compatible in that they have melting points which are reasonably close to each other so that they can fuse to provide a good seal. A characteristic of the spun-bonded polyolefin is that it becomes transparent when sealed to another body by the foregoing methods and therefore the annular sealed edge portion, such as 18 on the periphery of disc 17, is glossy while the central portion of disc 17 within annular periphery 18 retains its opaque paper-like appearance. This characteristic can be used to visually inspect membranes 17 and 19 for a good seal.

The cartridge 10 is filled with a suitable adsorbent 20 which will adsorb moisture, odor or gases from the surroundings into which cartridge 10 is placed. By way of example and not limitation, the adsorbent may be a substance such as Clintolite, activated charcoal, crystalline metal aluminosilicates, activated bentonite, silica gel, molecular sieve, calcium sulfate or any other suitable product or mixtures thereof.

The pore size of the spun-bonded polyolefin is such that it will pass only gases and liquid vapor but will not pass water droplets. Furthermore, it is especially significant that the pore size is so small that it will not pass carbon powder which has heretofore passed through drilled holes in end caps of prior types of cartridges.

The improved cartridge 10 of the present invention has an outer body configuration by which it can be distinguished by feel from medicinal capsules. A plurality of triangular splines or ribs 21 are formed integrally with and extend longitudinally of body portion 11. Ribs 21 each have an end 22 which terminates short of end 12 of body member 11. Thus, ribs 21 not only provide sharp edges 23 at the outer edges of the triangular splines or ribs 21 but also provide sharp points 24 at the junctions of edges 23 and ends 22. Thus, it is quite apparent that the ribs 21 on the outer surface of body member 11 can distinguish it by feel from the purely cylindrical outer surface of a medicinal capsule.

The fabrication process generally includes the steps of securing the membrane 19 to annular protuberance 15, filling the cartridge with adsorbent 20, from its open top, and thereafter securing the membrane 17 to annular protuberance 14 by any one of the above attachment processes. During the securing process pressure is applied to the membranes 17 and 19, and triangular ribs 21 on the outer surface of body member 11 provide columnar strength thereto to resist such pressure. In addition, bands 25 and 27 reinforce the ends of body member 11 against deflection during the pressure which is applied during the securing of membranes 17 and 19 thereto.

The membranes 17 and 19 are applied in the following manner. A sheet 30 of membrane material has discs 31, which eventually result in membranes 17 and 19, secured thereto by attachment portions 32 located at 90° from each other with cuts 33 therebetween. A disc 31 is superimposed over an end of body member 11 and heat and pressure is applied to fuse it to the end thereof, and this fusion melts attachment portions or tabs 32. As can be seen from FIGS. 6 and 7, annular protuberances 14 and 15 are pointed at 14' and 15', respectively, and this provides high energy points, as noted above. However, as can be seen from FIG. 2, the pointed outer ends 14' and 15' are flattened during the application of heat and pressure to thus provide a reasonably wide area of sealing contact between the membranes and the annular protuberances 14 and 15.

In accordance with the present invention internal circumferentially extending band 25 is formed integrally at one end of body member 11 and an external circumferentially extending band 27 is formed integrally at the other end of body member 11. These bands strengthen the body member against radial deflection when it is subjected to radial forces, thereby precluding separation of membranes 17 and 19 which would occur if there was such deflection. External band 27 is perceptible by feel to further distinguish cartridge 10 from a medicinal capsule with which it may be packed. Internal band 25 is of rectangular solid cross section with its longitudinal axis extending transversely to the wall 16 of body member 11, and external band 27 is of rectangular solid cross section with its longitudinal axis extending longitudinally of wall 16.

While the ribs 21 have been shown as triangular in cross section, it will be appreciated that they can be of any other suitable configuration which will distinguish the adsorbent cartridges by feel from medicinal capsules.

The spun-bonded polyolefin which seals the ends of the cartridge 10 is obtainable under the trademark TYVEK and one particular type contemplated for use is Grade 1059D. The TYVEK material comes in different grades, that is, different thicknesses, so that the exact thickness which is used for any specific application will depend on the desired rate of adsorption. The body members 11 are approximately ⅝ inches long and ½ inch in diameter, but they may vary in diameter from ¼ of an inch to ½ inch or larger and they may be of any desired length from less than one inch to a few inches. The thickness of wall 16 between ribs 21 is 0.030 inches, but may vary therefrom. The height of ribs 21 is approximately 0.070 inches. The use of the spun-bonded polyolefin ends on the cartridges of the present invention is especially desirable for packaging in medicinal products to insure that there is no dusting of the adsorbent out of the cartridges.

While the above embodiments show the spun-bonded polyolefin secured to opposite ends of a cylindrical body member, it will be appreciated that the body member may be made with an integral impervious end and that the spun-bonded polyolefin, in this event, is applied only to one open end of the cartridge, and this embodiment is within the scope of certain of the claims. Furthermore, for certain uses, spun-bonded polyolefin may not be necessary, and any other suitable porous or foraminous gas permeable membrane material may be used.

While preferred embodiments of the present invention have been disclosed, it will be appreciated that it is not limited thereto but may be otherwise embodied within the scope of the following claims.

What is claimed is:

1. An adsorbent cartridge for use in a container of pills, medicinal capsules, or the like, and which can be distinguished therefrom by feel comprising a hollow elongated body member having a wall with an outer surface and first and second ends, elongated ribs on said outer surface of said body member, an opening on at least one of said ends, a gas-permeable membrane closing said opening, adsorbent within said body member, and circumferentially extending band means formed integrally with at least one end of said body member to provide radial reinforcement to said body member to prevent separation of said gas permeable membrane therefrom in the event said body member is subjected to radial forces.

2. An adsorbent cartridge as set forth in claim 1 wherein said ribs do not extend all of the way to at least one of said first and second ends.

3. An adsorbent cartridge as set forth in claim 1 wherein said ribs do not extend all of the way to said first and second ends.

4. An adsorbent cartridge as set forth in claim 1 wherein said ribs are of triangular cross-sectional configuration.

5. An adsorbent cartridge as set forth in claim 4 wherein said triangular ribs have end portions which include points.

6. An adsorbent cartridge as set forth in claim 1 wherein said gas permeable membrane is spun-bonded polyolefin.

7. An adsorbent cartridge as set forth in claim 1 including a second opening at the other of said ends, and a second gas-permeable membrane closing said second opening.

8. An adsorbent cartridge as set forth in claim 7 wherein said circumferentially extending band means are formed at both ends of said body member.

9. An adsorbent cartridge as set forth in claim 8 wherein one of said band means is formed internally of said wall of said body member and the other of said band means is formed externally of said wall of said body member and is perceptible by feel to further distinguish it from a medicinal capsule.

10. An adsorbent cartridge as set forth in claim 9 wherein said ribs merge into said other of said band means.

11. An adsorbent cartridge as set forth in claim 10 wherein said ribs are of triangular cross-sectional configuration.

12. An adsorbent cartridge as set forth in claim 11 wherein said triangular ribs have end portions which include points.

13. An adsorbent cartridge as set forth in claim 9 wherein said one of said band means is of rectangular solid cross section with its longitudinal axis extending transversely to said wall of said body member.

14. An adsorbent cartridge as set forth in claim 13 wherein said other of said band means is of rectangular solid cross section with its longitudinal axis extending longitudinally of said wall of said body member.

15. An adsorbent cartridge as set forth in claim 14 wherein said ribs merge into said other of said band means.

16. An adsorbent cartridge as set forth in claim 9 wherein said other of said band means is of rectangular solid cross section with its longitudinal axis extending longitudinally of said wall of said body member.

17. An adsorbent cartridge as set forth in claim 1 wherein said elongated ribs extend lengthwise of said body member.

18. An adsorbent cartridge as set forth in claim 17 wherein said ribs are of triangular cross-sectional configuration.

19. An adsorbent cartridge as set forth in claim 18 wherein said triangular ribs have end portions which include points.

20. A method of fabricating an adsorbent cartridge including the steps of providing a hollow plastic body member with a wall and having at least one open end, providing reinforcement at said open end, providing a sheet of porous material having discs substantially of the size of said open end scored therein but attached thereto, said body member and said sheet of porous material having melting temperatures which are sufficiently close so that they can be fused together, superimposing a disc over said open end, and applying heat and pressure to said superimposed disc to fuse it to said end and simultaneously separate it from said sheet.

21. A method as set forth in claim 20 wherein said body member has a second open end, providing a second reinforcement at said second open end, and superimposing a second disc over said second open end, and applying heat and pressure to said second disc to fuse it to said end and simultaneously separate it from said sheet.

22. A method as set forth in claim 21 wherein said open ends include annular protuberances which originally had pointed ends before said discs were fused thereto and which are flattened after said discs were fused thereto to provide bands of engagement therebetween which are wider than said pointed ends.

23. A method as set forth in claim 20 wherein said open end includes an annular protuberance which originally had a pointed end before said disc is fused thereto and which is flattened after said disc has been fused thereto to provide a band of engagement therebetween which is wider than said pointed end.

* * * * *